UNITED STATES PATENT OFFICE.

GOODMAN CHARLES MANDLEBERG, HENRY LESSER ROTHBAND, AND SAMUEL LAWRENCE MANDLEBERG, OF MANCHESTER, ENGLAND.

PROCESS OF MANUFACTURING RUBBER GOODS.

SPECIFICATION forming part of Letters Patent No. 441,502, dated November 25, 1890.

Application filed February 5, 1890. Serial No. 339,339. (No specimens.) Patented in England November 14, 1888, No. 16,542, and March 2, 1889, No. 3,726; in France March 14, 1889, No. 196,712; in Belgium March 15, 1889, No. 85,405, and in Austria-Hungary August 31, 1889, XXXIX, 1,793, and XXIII, 1,747.

*To all whom it may concern:*

Be it known that we, GOODMAN CHARLES MANDLEBERG, HENRY LESSER ROTHBAND, and SAMUEL LAWRENCE MANDLEBERG, subjects of Her Majesty the Queen of the United Kingdom of Great Britain and Ireland, residing at Manchester, in the county of Lancaster, England, have invented certain new and useful Improvements in the Process of Manufacturing Rubber Goods, (for which we have obtained Letters Patent for the United Kingdom of Great Britain and Ireland, dated November 14, 1888, No. 16,542, and March 2, 1889, No. 3,726; in France, dated March 14, 1889, No. 196,712; in Belgium, dated March 15, 1889, No. 85,405, and in Austria-Hungary, dated August 31, 1889, Vol. 39, Fol. 1,793, Vol. 23, Fol. 1,747;) and we do hereby declare the following to be a full, clear, and exact description of the invention, such as will enable others skilled in the art to which it appertains to make and use the same.

The invention relates to the manufacture of rubber goods, and has for its object to improve the quality of such goods and to produce a rubber garment that is free from the usual unpleasant odors.

The invention consists in the mode or process of treating the fabrics usually employed in the manufacture of such goods and in the mode or process of treating the garments so as to render them free from the obnoxious odors, substantially as hereinafter described.

In carrying out our invention, in so far as it pertains to the deodorizing of the rubber garments, we make the garments from what are termed in the trade as "single-texture" india-rubber water-proof fabrics, which are single fabrics spread or proofed with, say, about five coats of dough mixtures of the kind commonly used in the trade; but using by preference dough mixtures free from what is known as "rubber substitutes" (such as those made from oils,) and then cured or vulcanized by what is termed the "cold cure" or process, and more especially intended for "ladies' water-proofs." These garments are exposed to dry air heated to about 200° Fahrenheit by suspending them on open-shoulder forms in the usual "stove," so that the heated air can circulate freely inside and outside of them for about half an hour, or until it shall be found that the disagreeable odor is driven off. In this process the heated air laden with the ill-smelling vapors is allowed to escape, and at the end of the process the garments will be free from disagreeable odor. The deodorized garments may then be perfumed by exposing them to the vapors or to air laden with the vapors of any desired essential oil—such as the oil of lavender or other desired oil—or a perfume or scenting material placed in the stove after the deodorizing process is completed.

Garments treated as described are suitable for wear in all temperate climates.

Garments made from what is known to the trade as "double-texture" water-proof fabrics manufactured in any well-known manner, but preferably without rubber substitutes, (such as those made from oil,) may be treated in a manner similar to that described above, and in the making of these garments the seams are preferably cemented by means of the "ordinary solution," not the vulcanized solution, though the latter may be used, if desired, and to effect the deodorization at a lower temperature we preferably use deodorized naphtha either as a solvent for the rubber compounds or in the cementing solution.

As above described, water-proof garments made from the described rubber goods as found in the market may be effectually deodorized and perfumed. We prefer, however, to make the garments from materials made according to the process described in our application for Letters Patent filed February 5, 1890, Serial No. 339,338, or from materials manufactured according to the process hereinafter described, for the reason that we obtain a better quality of goods in every respect and suitable for wear in any climate.

According to this process the fabric is first spread with a dough formed of india-rubber, litharge, sulphur, and naphtha solvent. The succeeding coats (of which about three should be applied) are also spread with a similar dough to that for the first coat, but with a little more sulphur in it than is used in the first coat, and then a last coat or two is applied same as the others, but without sulphur. Then farina or similar material is applied (if desired) to the proofed surface, and the fabric prepared as described, instead of being first partially vulcanized, is fully vulcanized by exposure to heat in the usual manner in an air-heated stove at a temperature of about 250° Fahrenheit. After vulcanization in the dry-air-heated stove the fabric is what is termed in the trade "semi-cured"—that is to say, hardened by the well-known liquid or cold process of vulcanization—by using a weak liquid that will sufficiently harden the surface; or the coated and vulcanized fabric may be treated by the well-known vapor cure alone, or other known means of hardening the surface may be employed, the object of which is to facilitate the making up of the prepared cloth into garments. The garments are then made from the vulcanized and cured material, the seams being cemented together with what is known as the "ordinary solution," which has no sulphur in it. The garments are then exposed in an air-heated stove to a temperature of about 200° Fahrenheit for a sufficient length of time to completely deodorize the same. When the latter process is completed, the garments are odorless or free from disagreeable smell, and may be perfumed, if desired, by exposure to the vapors or to air laden with the vapors of any desired essential oil—as, for instance, oil of lavender—and this may be done after the deodorizing process and in the same apparatus.

We do not desire to claim, broadly, the process of proofing the fabric first with a compound devoid of a vulcanizing agent, then with a compound combined with such an agent, and finally with a compound similar to that used for the first coating, but containing less litharge, as this is claimed in our application for patent above referred to; but What we do claim is—

1. The improvement in the process of manufacturing rubber goods, which consists in exposing the vulcanized or cured garments to the action of air heated to a temperature below that required for vulcanizing or curing such garments and without the employment of deodorizing agents, substantially as described.

2. The improvement in the process of manufacturing rubber goods, which consists in exposing the vulcanized or cured garments to the action of dry air heated to about 200° Fahrenheit and without the use of deodorizing agents, substantially as described.

3. The improvement in the process of manufacturing rubber goods, which consists in exposing the vulcanized or cured garments to the action of dry air heated to about 200° Fahrenheit without the use of deodorizing agents, and then exposing the garments to the fumes or vapors of an essential oil or other scenting substance, substantially as described.

4. The improvement in the process of manufacturing rubber garments, which consists in coating a fabric first with a rubber compound containing a vulcanizing agent in limited proportions, then with such a compound containing a vulcanizing agent in larger proportions, and lastly with a rubber compound devoid of a vulcanizing agent, vulcanizing the fabric so prepared, and curing the same, as set forth.

5. The improvement in the process of manufacturing rubber goods, which consists in coating a fabric first with a rubber compound containing a vulcanizing agent in limited proportions, then with such a compound containing a vulcanizing agent in larger proportions, and lastly with a rubber compound devoid of a vulcanizing agent, vulcanizing the fabric so prepared and curing the same, making the garments from the fabric, and deodorizing the garments, as set forth.

6. The improvement in the process of manufacturing rubber goods, which consists in coating a fabric first with a rubber compound containing a vulcanizing agent in limited proportions, then with such a compound containing a vulcanizing agent in larger proportions, and lastly with a rubber compound devoid of a vulcanizing agent, vulcanizing the fabric so prepared and curing the same, making the garments from the fabric, and deodorizing and perfuming the garments, as set forth.

7. The improvement in the process of manufacturing rubber garments, which consists in coating a fabric first with a rubber compound free from rubber substitutes, such as those made from oils, vulcanizing the coated fabric or the garments made therefrom by the cold process, and exposing the same to a temperature below a vulcanizing temperature, substantially as and for the purposes specified.

8. The improvement in the process of manufacturing rubber garments, which consists in coating a fabric with rubber or a rubber compound in the usual manner, applying farina to the proofed fabric, vulcanizing the same or the garments made therefrom by the cold process, and deodorizing by exposure to a temperature not exceeding 200° Fahrenheit, substantially as and for the purposes specified.

In testimony whereof we affix our signatures in the presence of two witnesses.

GOODMAN CHARLES MANDLEBERG.
HENRY LESSER ROTHBAND.
SAMUEL LAWRENCE MANDLEBERG.

Witnesses:
PETER J. LIVSEY,
WILLIAM FAULKNER.